United States Patent [19]

Bovio et al.

[11] 4,238,807

[45] Dec. 9, 1980

[54] NON-IMPACT PRINTING DEVICE

[75] Inventors: Michele Bovio, Brosso; Aquilino Barbero, Pavone; Walter Gillone, Ivrea; Pierangelo Berruti, Chivasso, all of Italy

[73] Assignee: Ing. C. Olivetti & C., S.p.A., Ivrea, Italy

[21] Appl. No.: 972,267

[22] Filed: Dec. 22, 1978

[30] Foreign Application Priority Data

Dec. 28, 1977 [IT] Italy .............................. 69927 A/77

[51] Int. Cl.³ .............................................. G01D 15/18

[52] U.S. Cl. ................................................ 346/140 R

[58] Field of Search .................................. 346/75, 140

[56] References Cited

U.S. PATENT DOCUMENTS 2,173,741 9/1939 Wise et al. .................... 346/140 UX 2,600,129 6/1952 Richards ........................ 346/75 UX 4,064,513 12/1977 Skala ..................................... 346/75

*Primary Examiner*—George H. Miller, Jr.

*Attorney, Agent, or Firm*—W. R. Hulbert

[57] ABSTRACT

A non-impact printing device with selective emission of solid ink particles is disclosed. A rod 19 of solid ink is pressed by a spring 20 in an insulating housing II against an end wall with a nozzle 13 therein. A pulsed high voltage applied between the ink rod and a counter-electrode 16 (which can be behind the paper 25) causes ink particles to be eroded from the rod and ejected through the nozzle on the paper. Printers are described which employ incremental line-feed paper movement, movement of printing devices as just described along the printing line, and selective control of the high-voltage pulsing such as to form characters by a dot matrix technique.

23 Claims, 9 Drawing Figures

NON-IMPACT PRINTING DEVICE

BACKGROUND OF THE INVENTION

The present invention relates to a non-impact printing device for recording graphic symbols on ordinary paper by means of selective emission of ink particles by an ejector.

Devices of the aforesaid type are known wherein drops of liquid ink are emitted selectively through a nozzle by an ejector device actuated through the medium of a piezoelectric crystal and wherein to every electrical stress applied to the crystal there correspond a compression of the volume of the chamber containing the ink and a corresponding emission of drops through the nozzle.

Devices are moreover known wherein the emission of drops is caused by applying a potential difference between the conductive liquid ink and the mouth of the nozzle, as in the U.S. Pat. No. 1,958,406.

One of the problems which arise with the aforesaid devices known in the art is that the liquid ink encrusts the nozzle and ends by blocking it in the course of time. The choice of special water-based inks does not permit the problem of encrustation to be solved completely.

OBJECT AND SUMMARY OF THE PRESENT INVENTION

The object of the present invention is therefore to provide a printing device with selective emission of solid ink particles by an ejector which is free from encrustation problems. A rod of said ink consisting of carbon black compressed with 5% to 20% of stearic acid as binder is pressed by a spring into an insulating housing against an end wall having a nozzle therein. A pulsed high voltage, applied between the ink rod and a counter electrode, causes ink particles to be eroded from the rod and ejected through the nozzle on the paper.

A further object of the present invention is to provide a printer employing a plurality of such solid ink printing devices, including an incremental line-feed paper movement, an alternating moving device for said printing devices along the printing line, and a selective control of the pulsed high voltage to form characters by a dot matrix technique.

BRIEF DESCRIPTION OF THE DRAWINGS

The invention will be described in more detail, by way of example, with reference to the accompanying drawings, in which.

DESCRIPTION OF THE PREFERRED EMBODIMENT

Figure 1:
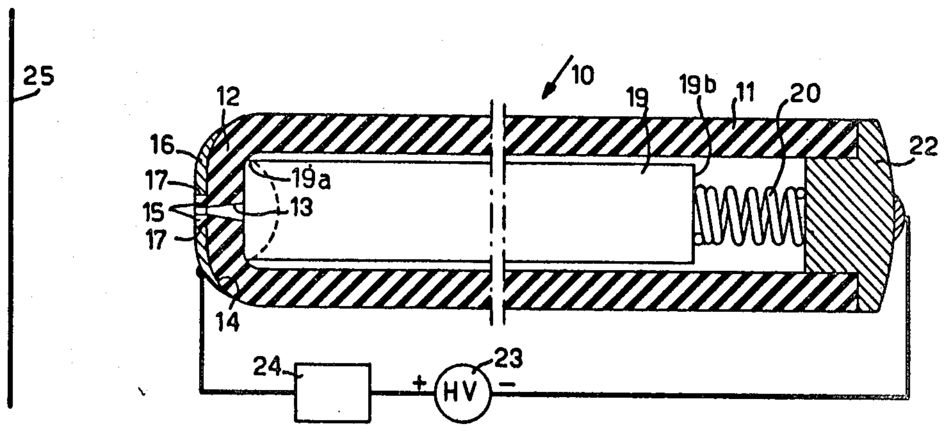
FIG. 1 is a longitudinal section of a first embodiment of the printing device according to the invention.

Referring to FIG. 1, the printing device 10 comprises a hollow cylinder 11 of electrically insulating material, such as glass, ceramic or thermosetting resin, which is closed at one end by a wall 12 in the centre of which there is formed a hole 13 flared towards the inside, with a diameter of the order of 1/10 of a millimeter so as to assume a substantially frustoconical longitudinal section.

On its outer surface 14 the wall 12 has a circular projection 15 in correspondence with the hole 13.

A circular electrode 16 having a hole 17 in the centre is mounted on the outer surface 14 and on the circular projection 15 in such manner that the hole 17 is concentric with the hole 13. The circular electrode 16 may be obtained by means of metallization of the outer wall surface 14.

Inside the hollow cylinder 11 there is mounted a cylindrical rod of electrically conductive ink having a diameter slightly smaller than the inner diameter of the hollow cylinder 11 and obtained by compressing carbon black (80%-95%) with a binder (5%-20%) of the type: waxes of various kinds, fatty acids, paraffins, cellulose resins and glycols. One end 19*a* of the rod 19 is pushed against the wall 12 by the action of a spring 20 compressed between the opposite end 19*b* of the rod 19 and a metallic abutment element 22, which can be fixed removably to the hollow cylinder 11, for example inserted therein as a plug.

The circular electrode 16 is connected to the positive pole of a high voltage generator 23 via a break circuit 24; the solid ink 19 is connected to the negative pole of the high voltage generator 23 via the abutment element 22 and the spring 20.

By applying a potential difference of the order of 4000 V between the two electrodes 16 and 22 by means of activation of the break circuit 24, erosion of ink particles from the surface 19*a* of the rod occurs and they are emitted through the hole 13 against a recording sheet 25 located at a distance of 0.5 to 5 mm, forming thereon a sufficiently clear and focused black dot.

The physical explanation of the phenomenon is not exactly known; it is probably to be looked for in the formation of an electric arc between the surface 19*a* of the ink rod 19 and the electrode 16, with a consequent transport of ink towards the electrode 16 and, because of the hole 13, against the recording sheet 25; a concomitant effect is probably that due to breakdown of the air dielectric in the conical hole 13, which causes a pressure wave inside the hole and in the adjacent area inside the hollow cylinder such as to "fire" the eroded particles against the recording sheet 25 and keep the hole 13 constantly clear from encrustations. The conviction that the predominant cause of the phenomenon is due to the electric arc is reinforced by the fact that on inverting the polarities of the foregoing connection (that is, positive pole to the ink rod) the phenomenon does not manifest itself in optimum manner. In fact, for formation of the electric arc, it is necessary that there be heating of the cathode and this does not occur when the cathode is located on the metallic electrode 16 instead of on the solid ink.

Surprisingly the inversion of polarity causes, on the other hand, a phenomenon of sucking back of the particles deposited on the recording sheet towards the hole 13, with at least partial erasure of a previously printed dot.

Starting with a plane surface 19*a*, the erosion of the rod 19 is not uniform, at least initially, over the entire surface, but is greater in the centre and steadily falls off towards the edges and, for obvious reasons of symmetry, after a prolonged number of discharges, the surface 19*a* therefore acquires the form of a spherical cup, as shown in FIG. 1.

For correct functioning of the device, it is necessary that the erosion also take place at the places where the curved surface 19*a* bears against the wall 12, so as to permit the supply of fresh ink by means of a sliding action of the rod 19 produced by means of the spring 20.

It has been found that with an average diameter of the hole between 0.1 mm and 0.3 mm and a length of the hole between 0.6 mm and 1.5 mm, with a diameter of the rod 19 between 2 mm and 3 mm and with the spring applying a force of from 200 g to 500 g, the supply of ink takes place regularly and the repeatability of the printed dot is ensured.

Figure 5A:
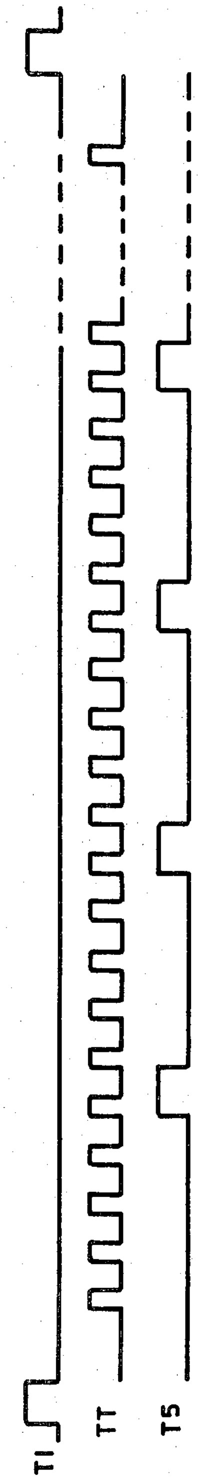
FIGS. 5*a, b, c, d,* are time diagrams of the signals generated by the control unit of FIG. 4.
Figure 5B:
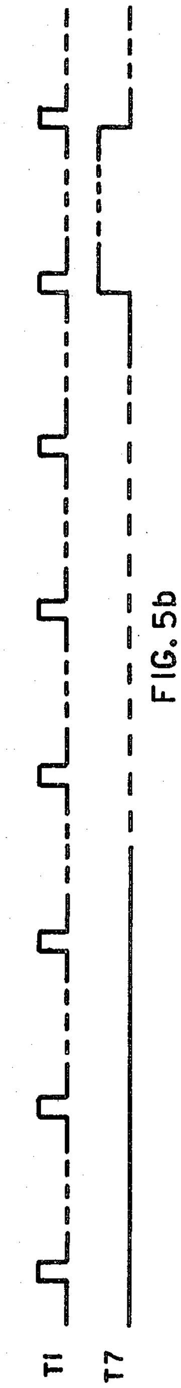
Figure 5C:
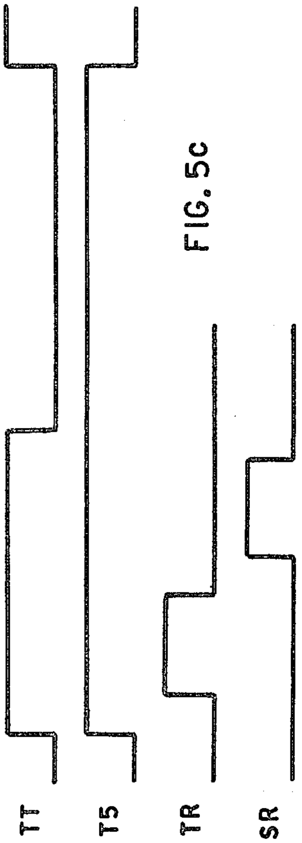
Figure 5D:
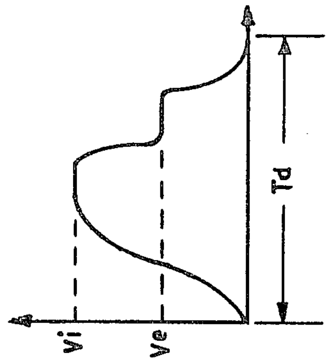

Optimum results are obtained with the aforesaid dimensions by applying between the electrodes 16 and 22 a pulsed potential difference of the order of 4000 V, with a duration Td between 1 and 200 μs and with a waveform substantially of the type shown in FIG. 5*d* with $V_i \approx 4000$ V and $V_e \approx 2500$—3000 V.

With these values, a printing speed of 5000 dots per second has been achieved, with good visibility of the printed dot.

Figure 2:
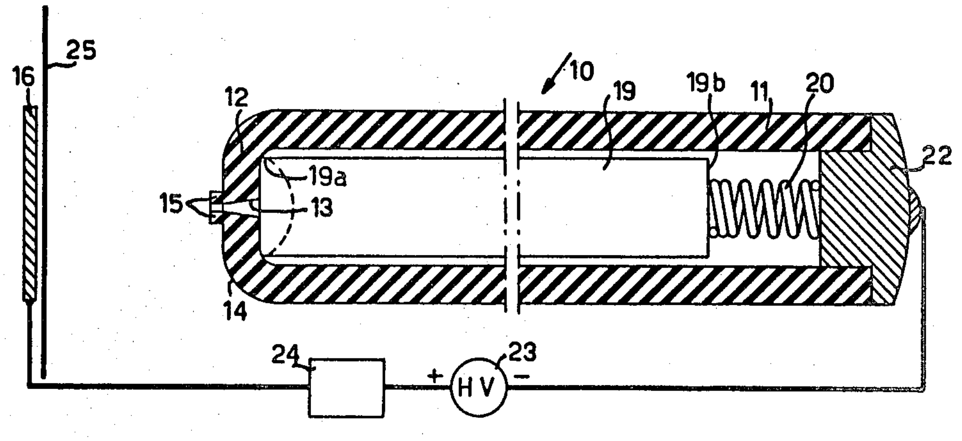
FIG. 2 is a longitudinal section of a second embodiment of the printing device according to the invention.

The position and the shape of the electrode 16 have no effect on the operation of the device and, in fact, good results have been obtained with the device of FIG. 2, in which the second electrode 16 is placed behind the recording sheet 25, with the hole to recording sheet distance of the order of 0.5 to 1 mm. On the other hand, in this second embodiment, the phenomenon of erasure of the printed dot is accentuated by inverting the polarity between the two electrodes 16 and 22.

Figure 3:
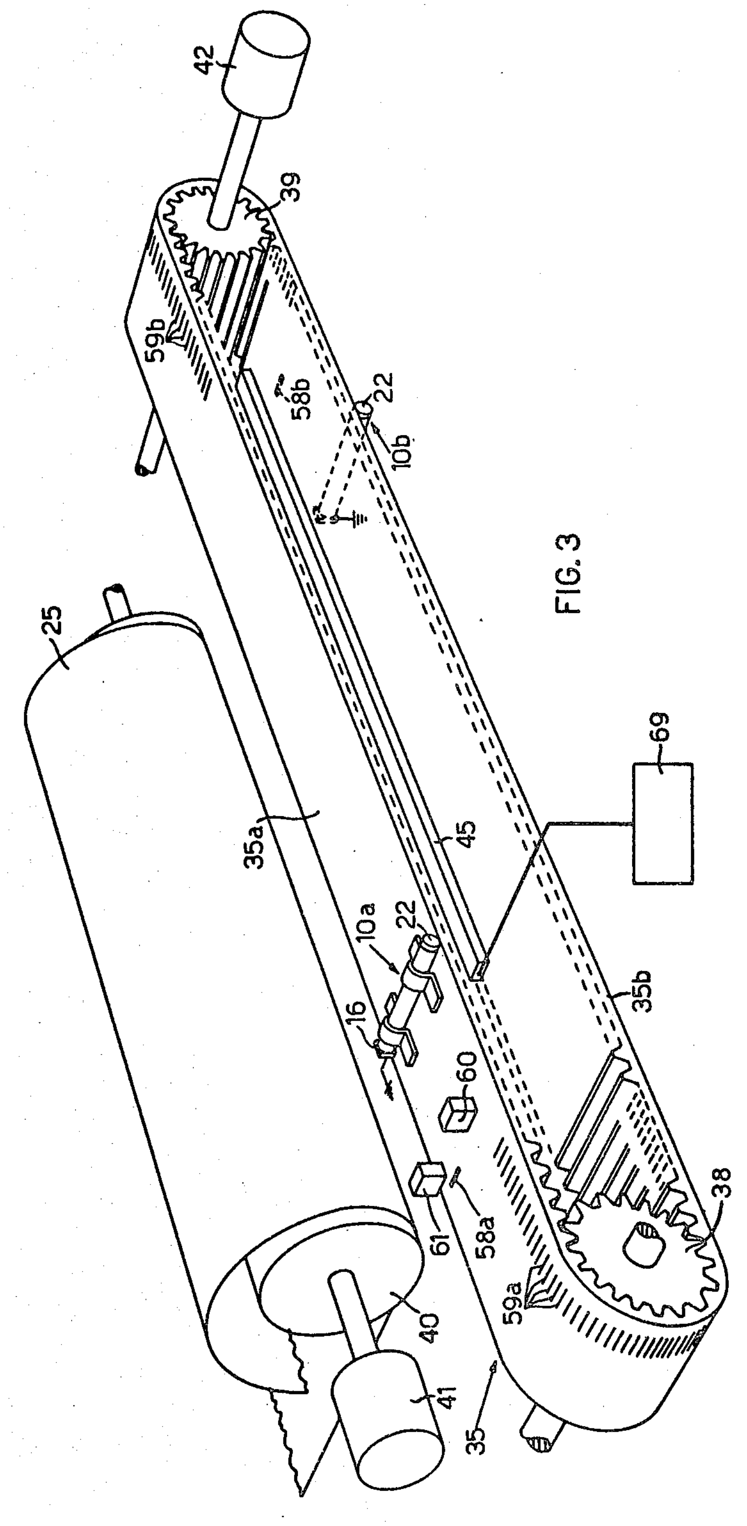
FIG. 3 is a perspective view of a serial printer using a printing device according to the invention.

The printing device hereinbefore described constitutes a low-cost printing head 10 which can be employed with advantage in serial, series-parallel and parallel alphanumeric printers for office machines and, moreover, for plotter devices and for facsimile applications. FIG. 3 shows an embodiment of a serial printer using the printing device or head 10.

Two printing heads 10*a*, 10*b* are mounted on an endless belt 35 which passes round toothed wheels 38 and 39 so that the runs 35*a* and 35*b* of the belt are parallel to the printing line of the recording sheet 25 passed around a platen 40 advanced by elementary line-spacings by means of a stepping motor 41. The endless belt 35 is driven to rotate clockwise (in FIG. 3) at constant speed by means of a DC motor 42.

Figure 4:
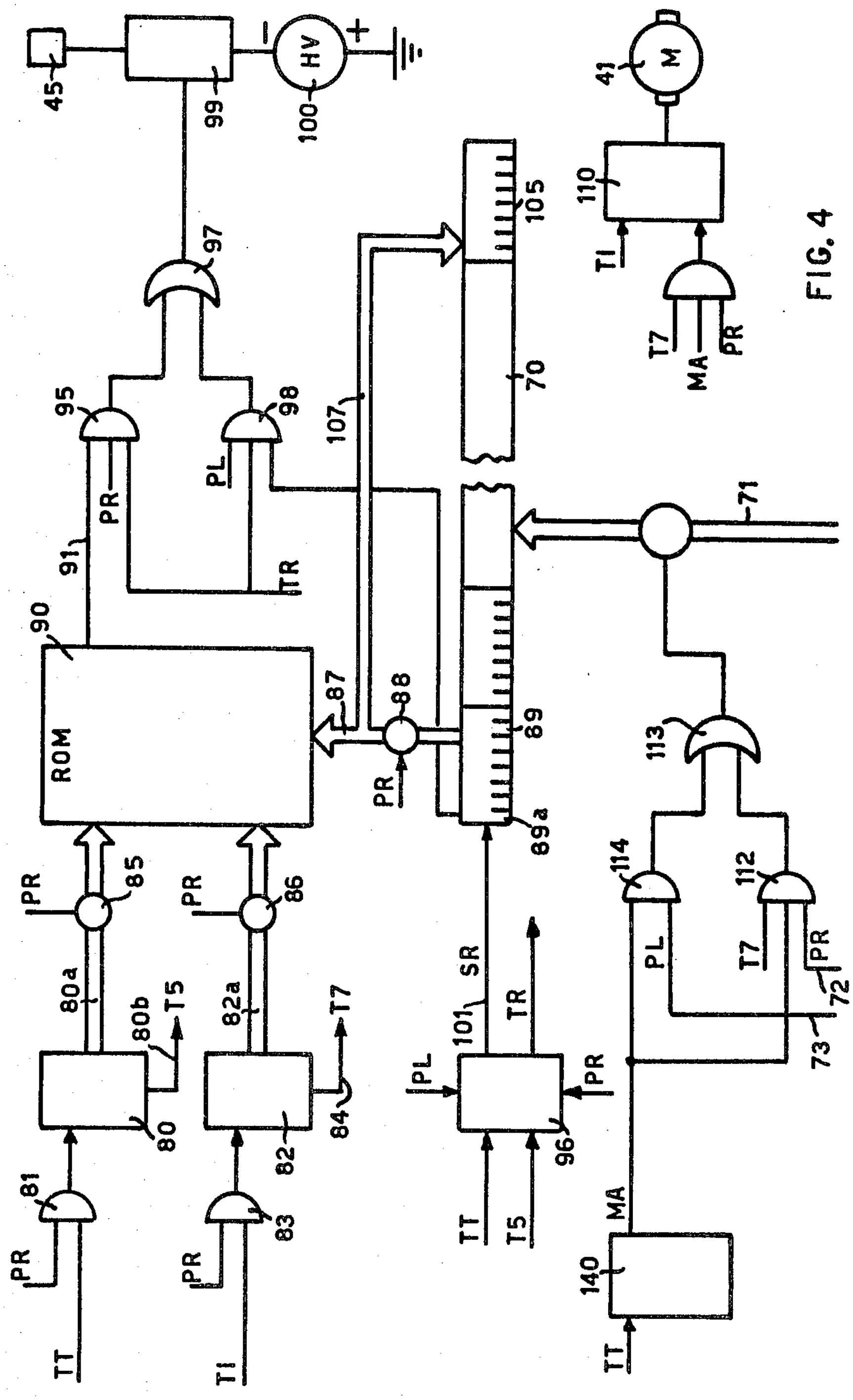
FIG. 4 is a logic diagram of the control unit of the printer of FIG. 3.

The electrode 16 of each of the heads 10*a* and 10*b* is connected to earth through the belt 35. Parallel to the upper strand 35*a* of the belt 35 there is mounted a metal strip 45 connected in a control logic unit 69 (FIG. 4), via an energizing circuit 99 to the negative pole of a high voltage generator 100, the positive pole of which is earthed.

The heads 10*a* and 10*b* are spaced equally apart on the endless belt 35 so that when one is located at the left-hand end of the strand 35*a* the other is located at the right-hand end of the strand 35*b*.

Each of the heads 10*a* and 10*b* transported by the belt 35 moves in the upper run 35*a* with the rear electrode 22 a few millimeters distant from the metal strip 45 and no metallic connection exists between the strip 45 and the electrode 22. The high voltage pulses are transmitted by the strip 45 to the electrode 22 through the medium of an electric arc via the air dielectric.

On the belt runs 35*a*, 35*b* there are moreover formed pluralities of notches 58*a*, 59*a* and 58*b*, 59*b* adapted to be detected by photocell sensing devices 60 and 61, respectively (FIG. 3).

The notches 59*a* and 59*b* follow the printing devices 10*a* and 10*b*, respectively, in the direction of movement of the belt 35 and cause the sending of strobe signals TT (FIG. 5*a*) to the control unit 69 (FIG. 4) through the medium of the sensing device 60, the strobe signals being adapted to define the printing positions for each dot along the printing line.

The first notch 58*a* and 58*b* (FIG. 3) of each run is detected by the photocell device 61, which sends to the control unit a signal TI FIG. 5*b*) which enables the beginning of the printing of a fresh line of dots and which commands the carrying out of an elementary line-spacing operation of the platen 40 by means of the stepping motor 41.

The control logic unit 69 of the printer (FIG. 4) comprises a shift register 70 within which there is stored the information relating to a line of print which comes from the channel 71, for example the output channel of the central unit of a processor to which the printer is understood to be connected.

The signals PR and PL coming from the said processor on wires 72 and 73, respectively, are also applied as input to the control logic unit and, when at logical 1 level, select a plotter (PL) operation mode and a printer (PR) operation mode, respectively, for the control logic unit.

In the first case (PL=1), there is a one-to-one correspondence between the storage cells of the register 70 and the dot printing positions of the printing line.

Each storage cell of the register 70 will therefore have stored therein an information bit at logical 0 level if a dot does not have to be printed in the corresponding printing position, or a bit at logical 1 level if, on the other hand, a dot must be printed in the corresponding printing position.

In the second case (PR=1), the register 70 is regarded as divided into groups of eight storage cells (bytes), each of which is adapted to store a binary code of an alphanumeric character and each of which corresponds to a printing position of a character within the printing line. Assuming the characters are printed in matrices of seven rows by five columns of dots, there is a character printing position for every five dot printing positions.

The signals TT coming from the light-sensing device 60 are applied as input count signals to a column counter 80 through an AND circuit 81 enabled by the condition PR=1. The counter 80 counts cyclically from 1 to 5 and, on reaching its maximum counting capacity (5), is adapted to emit a signl T5 on its output 80*b*.

The signals TI coming from the light-sensing device 61 are applied as input as count signals to a row counter 82 through an AND circuit 83 enabled by the condition PR=1. The counter 82 counts cyclically from 1 to 7 and, on reaching its maximum counting capacity (7), is adapted to emit a signal T7 on its output 84. The signals TT are moreover applied as input count signals to a counter 140. The counter has a maximum counting capacity equal to the number of storage cells of the register 70 and generates a signal MA at logical 1 level when it reaches its maximum counting capacity.

In the operation of the printer, the counters 80, 82 and 140 therefore define that dot of the 7×5 matrix of which possible printing is enabled in the printing position identified by the counter 140.

The outputs 80*a* and 82*a* of the counters 80 and 82 are applied as input, through the medium of the AND circuits 85 and 86 enabled by the condition PR=1, to a ROM (read only memory) 90 which also receives as input, through the medium of the channel 87 and the AND circuit 88, the binary code of the alphanumeric character contained in the byte 89 most to the left of the register 70.

The ROM 90 has stored the printing and non-printing information for each dot of the 7×5 matrix identified by the counters 80 and 82 for each printable alphanumeric character (space included) identified by the byte 89. The ROM 90 supplies a signal at logical 1 level as output on the wire 91 if the identified dot of the matrix is to be printed for formation of the identified character, and at logical 0 level in the opposite case.

With the condition PR=1, the output 91 enables the AND circuit 95 which, with the timing of a signal TR supplied by a timing unit 96 and via the OR circuit 97, activates the energizing circuit 99 interposed between the negative pole of the high voltage generator 100 and the strip 45, and, by energizing the printing head 10, causes the printing of a dot on the recording sheet. The energizing circuit of the high voltage generator can moreover be activated in the plotter operation mode (PL=1) through the medium of the OR circuit 97 and the AND circuit 98, the latter being enabled by the condition PL=1 and by the presence of a bit at logical 1 level in the storage cell 89*a* on the extreme left of the register 70, with the timing of the signal TR.

The timing circuit 96, which is of known type, receives as input the signals TT, the signals T5 and the signals PR and PL and is adapted to emit, on the output 101 and as input to the register 70, a signal SR for a shift to the left for each signal TT received if PL=1, and eight consecutive signals SR for a shift to the left for each signal T5 received if PR=1, with a predetermined delay with respect to the signals TT and T5 (FIG. 5). The timing circuit 96 moreover emits as output a signal TR for each input signal TT.

During the printer operation mode, a channel 107 enabled by the condition PR=1 connects the output of the byte 89 of the register 70 with the byte 105 on the extreme right of the register 70.

Therefore, with PR=1, at each advance of the belt 35 by five notches (at each signal T5), the alphanumeric codes stored in the register 70 are translated to the left by one byte by means of eight signals SR and the code of the byte 89 is stored in the byte 105, so that the code of the alphanumeric character adjacent that previously processed for the printing of a dot matrix row is applied as input to the ROM 90 by way of the channel 87.

With PL=1, on the other hand, at each advance by one notch 59, the contents of the storage cells of the register 70 are translated to the left by one cell, so that the information bit adjacent that previously processed for the printing of a dot is stored in the cell 89*a* and that previously processed is lost in the shift. With PR=1, the contents of the register 70 are renewed by the processor, to which the printer is connected, with the rise to 1 of the signal MA following the rise to 1 of the signal T7, with enabling of the channel 71 through the medium of the AND circuit 112 and the OR circuit 113.

With PL=1, on the other hand, the contents of the register 70 are renewed by the processor at each signal MA=1 through the medium of the AND circuit 112 and the OR circuit 114. Each signal TI moreover activates the driving circuit 110 of the stepping motor 41 for the execution of a corresponding elementary line-spacing, while with PR=1 the signal MA=1 following the rise of the signal T7 to logical 1 level activates the driving circuit 110 through the AND circuit 120 for the execution of three consecutive line-spacings corresponding to the space between one line of characters and the next. Since the printing commands for the heads 10 are applied to the strip 45, and not directly to the electrode 22 of the head by means of a metallic connection, they are effective only for that head 10 which is running adjacent the strip 45 during the application of a command.

The control unit therefore pays no regard to the presence of one, two or more heads, provided that each head is accompanied by reference notches which allow the position thereof to be detected and the command pulses on the strip 45 to be synchronized with the position.

In addition to permitting control of the head 10, it has been found that the electric discharge which develops between the strip 45 and the rear electrode of the head assists the formation of the electric are between the ink rod 19 and the electrode 16 and, therefore, also the emission of ink particles for the printing of the dot.

Figure 6:
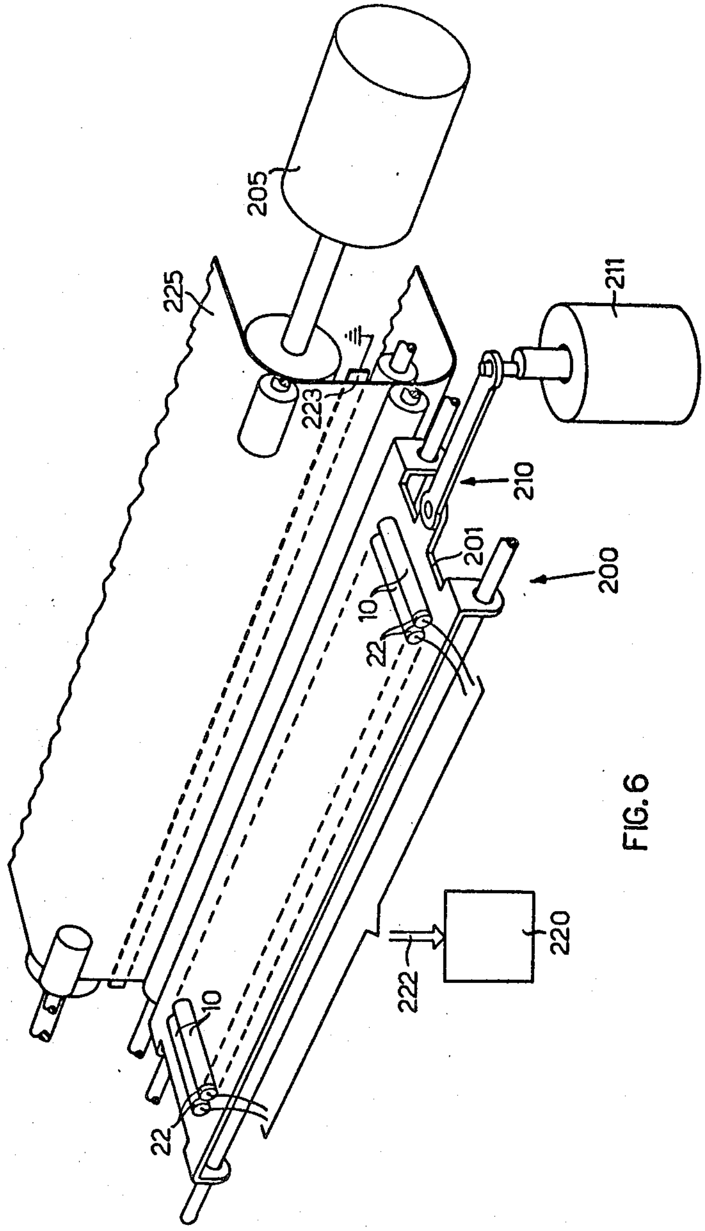
FIG. 6 is a perspective view of a series-parallel printer using a printing device according to the invention.

In accordance with another embodiment of the present invention, FIG. 6 shows a series-parallel printer 200 in which a plurality of heads 10 is mounted on a carriage or slide 201 in such manner that they are aligned and spaced regularly parallel to the printing line of the recording carrier 225 advanced by elementary line-spacings through the medium of the stepping motor 205.

The carriage is made to oscillate parallel to the printing line by means of the eccentric device 210 driven by the DC motor 211. The number of heads 10 mounted on the carriage 201 may be equal to the number of characters which can be written in a line of print and in this case the stroke of the carriage will be at least equal to the width of a character of the line and each head 10 will describe at each oscillation a row of dots of the matrix of an alphanumeric character and, through repeated oscillations, all the matrix dots of a character of the line of print.

Alternatively, the number of heads 10 may be equal to one half of the number of characters which can be written in a line of print and the stroke of the carriage will then have to be at least equal to the width of two characters plus an intercharacter spacing and each head will describe all the matrix dots of two adjacent characters of the line of print through repeated oscillations of the carriage.

The printing command is given simultaneously to all the printing heads 10 through the medium of a control unit 220 by simultaneously reading from the memory in a known manner the printing information of one line at a time (FIG. 6), which, through a cable 222 and the electrodes 22, effect the selective and simultaneous activation of the emission means 19 of all printing devices 10 for a number of times equal to the number of columns in the character matrix during a passage of the carriage 201 produced by the eccentric device 210. In addition the line spacing means 205 is conditioned to advance the recording sheet 225 during each reversal of movement of the carriage 20I, whereby a line of characters is printed during a number of consecutive passages equal to the number of rows in the character matrix.

The front electrodes 16 of the heads 10 are replaced in the printer 200 by a single electrode 223 located behind the recording sheet 225 and connected to earth, in accordance with the configuration already described with reference to FIG. 2.

We claim:

1. A non-impact printing device for printing symbols on a recording sheet by means of selective emission of ink particles from a nozzle, comprising a housing of electrically insulative material defining said nozzle at one end facing said sheet, a rod of electrically conductive solid ink comprising a compressed mixture of pigmented particles and a binder mounted in said housing with an end adjacent said nozzle, first and second electrodes spaced from each other on opposite sides of said nozzle, the first electrode being electrically connected to said rod, the second electrode being located adjacent said sheet, and selectively activated means for generating a predetermined high voltage between said electrodes sufficient to overcome the binding action of said binder on the solid ink particles of said rod adjacent said nozzle to cause erosion thereof from said rod, to eject them through said nozzle and to move them rectilinearly toward said sheet.

2. Printing device according to claim 1, wherein the conductive solid or plastic ink comprises a compressed mixture of stearic acid and carbon black.

3. Printing device according to claim 1, wherein said housing means comprise a chamber adjacent to and in communication with said nozzle, and means for pressing said rod in said chamber towards the nozzle.

4. A printing device according to claim 1, wherein said second electrode is located behind said recording sheet.

5. A printing device according to claim 1 wherein said first electrode is connected to the negative pole of said voltage generating means and said second electrode is connected to the positive pole thereof.

6. A printing device according to claim 1, wherein said mixture is formed in the range of 8° to 95 percent of pigmented particles, and 20 to 5 percent of binder.

7. A printing device according to claim 1, wherein said first electrode is fixedly mounted with respect to movement of said housing and comprises a bar extending along the printing line of said printing device.

8. Printing device according to claim 1, wherein the distance of said nozzle from said recording sheet is in the range of 0.5–1 mm.

9. Printing device according to claim 8, wherein the diameter of said nozzle is in the range of 0.1–0.5 mm and the diameter of said rod is between 2 and 3 mm.

10. Printing device according to claim 1, wherein, in operation, a pulsed voltage is applied having a duration between 1 and 200 μs with a first peak of the order of 4,000 V followed by a drop to a value between 2,500 and 3,000 V which is maintained for a following portion of the duration of the pulse and drops to zero at the end of the pulse.

11. A printing device according to claim 10, including means for so relatively displacing said housing and said recording sheet as to cause the printing in a series of consecutive locations, the duration of said pulsed voltage being less than the duration of the relative movement of said housing and sheet.

12. A printing device according to claim 1, wherein said second electrode is circular and mounted coaxially with said nozzle and externally thereof in contact with said housing in a zone between said nozzle and said sheet.

13. A printing device according to claim 12, wherein said selectively activated means is adapted to generate a voltage sufficient for generating an electric arc between said rod and said second electrode.

14. Printer for non-impact printing of alphanumeric characters in dot matrices of the type comprising a plurality of selectively activable solid ink printing devices mounted on a carriage, spaced regularly along the printing line of a recording sheet and selectively activable for printing a dot, line-spacing means for incremental advance of the recording sheet perpendicularly to the printing line, means for the reciprocating rectilinear movement of the carriage along the printing line and means for detecting the position of the said carriage, wherein, said printing devices comprise means for housing said solid ink adjacent to a nozzle and selectively activable means for eroding and emitting ink particles from the housing means through the nozzle to form a printed dot on said recording sheet, and said detecting means condition the selectively activable pulse generator and the line-spacing means so that, during repeated reciprocating movements of the carriage, each of the printing devices prints all the dots of at least one character of the line of print.

15. Printer according to claim 14, wherein the number of said printing devices is equal to the number of characters in a line of print, said detecting means effecting selective and simultaneous activation of the eroding means of all the printing devices for a number of times equal to the number of columns in the matrix during a passage of the carriage.

16. Printer according to claim 15, wherein said line-spacing means advance the recording sheet during each reversal of movement of the carriage, a line of characters being printed during a number of consecutive passages equal to the number of rows in the matrix.

17. The combination of claim 14, wherein said solid ink is a compressed mixture of ink particles and a binder in the form of a rod, and said pulse generator includes a high voltage generator for generating a predetermined voltage between first and second electrodes located on opposite sides of said nozzle, said first electrode being electrically connected to said rod, the second electrode being located adjacent said recording sheet, said voltage being sufficient to overcome the binding action of said binder on said particles near said nozzle to cause the erosion of ink particles from said rod and the ejection thereof through said nozzle for moving said particles in a constant rectilinear path toward said sheet.

18. The combination of claim 17, wherein said first electrode comprises a bar mounted parallel to said printing line, fixed with respect to said housing and extending at least the length of the printing line.

19. Printer employing a printing device according to claim 17, wherein said means for relatively displacing comprises means for moving one or more of the printing devices along a path parallel to the printing line, line-spacing means for incremental advance of the recording sheet transversely of the printing line, and means for detecting the position of the or each of the devices along the path for selective activation of the voltage generator in synchronism with the movement.

20. Printer according to claim 17, wherein said moving means comprise an endless belt having a straight run along the said path.

21. Printer according to claim 20, wherein said first electrode is mounted adjacent said straight run and fixed with respect to said recording sheet, and the transmission of electric energy between the fixed electrode and the rod movable with the belt, when the voltage generator are activated, takes place through an electric discharge in air.

22. Printer according to claim 21, wherein said printing devices are mounted on said belt spaced regularly thereon in such manner that a single printing device at a time travels along the said path.

23. Printer according to claim 22, wherein said detecting means comprise a plurality of notches for the or each printing device which are provided on said belt, and sensing devices for the notches.

* * * * *

UNITED STATES PATENT AND TRADEMARK OFFICE
CERTIFICATE OF CORRECTION

PATENT NO. : 4,238,807
DATED : December 9, 1980
INVENTOR(S) : Michele Bovio et al.

It is certified that error appears in the above-identified patent and that said Letters Patent are hereby corrected as shown below:

Column 4, line 18, change "TI Fig. 5b" to --TI (Fig. 5b)--.

Column 4, line 58, change "signl" to --signal--.

Column 6, line 29, change "are" to --arc--.

Column 7, line 46, (claim 6) change "8° to 95 percent" to --80 to 95 percent--.

Signed and Sealed this

*Twelfth* Day of *October 1982*

[SEAL]

*Attest:*

GERALD J. MOSSINGHOFF

*Attesting Officer* *Commissioner of Patents and Trademarks*